INVENTOR.
KENNETH E. HARWELL

BY

ATTORNEY

INVENTOR.
KENNETH E. HARWELL
BY Robert H. Rosenof
ATTORNEY 3,445,493
SEPARATION OF ALKYL ALUMINUM COMPOUNDS ON AN EXCHANGE RESIN
Kenneth E. Harwell, Ponca City, Okla., assignor to Continental Oil Company, Ponca City, Okla., a corporation of Delaware
Filed Mar. 19, 1965, Ser. No. 441,118
Int. Cl. C07f 5/06
U.S. Cl. 260—448                10 Claims

ABSTRACT OF THE DISCLOSURE

Aluminum alkyls having alkyl groups of varying carbon atom distribution can be separated by passing the mixture past a porous exchange resin having a predetermined average pore size and containing a functional group capable of forming a bond with the aluminum alkyl. The smaller molecular weight material will enter the pores and be bonded thereto whereas the larger molecular weight material will pass through the system.

---

This invention relates to separation of aluminum alkyl compounds. In a more limited aspect, this invention relates to separation of aluminum alkyls containing low molecular weight alkyl substituents from such compounds containing higher molecular weight substituents as obtained by the so-called growth process.

It is well known that with aluminum chemistry as first disclosed by Dr. Karl Ziegler that aluminum alkyls such as aluminum triethyl, diethylaluminum hydride, aluminum triisopropyl etc. long chain alkyls of aluminum can be obtained by subjecting the aluminum alkyl to growth conditions with ethylene. The ethylene adds to the aluminum alkyl to form these high molecular weight products, hereinafter referred to as growth product.

For industrial and commercial purposes, it is highly desirable to grow the alkyl groups to a specific length or a narrow range of molecular weights. In the growth reactor the alkyl groups grow in a statistical or Poisson distribution. That is, the alkyl groups will vary in chain length over a wide range. One method of overcoming this is to displace the alkyl with a lower olefin to produce olefins of higher molecular weight, or to oxidize the aluminum alkyl to the alkoxides and hydrolyze the product to produce the alcohols after which the olefins or alcohols can be separated. However, each of these methods has disadvantages. For example, catalytic displacement of the olefins leaves the low molecular weight aluminum alkyl contaminated with the displacement catalyst so that it is no longer suitable for growth. If the alkoxides are first formed, the aluminum is recovered as the acid salt of aluminum, e.g., if hydrolyzed with $H_2SO_4$, the aluminum is recovered as alum.

It would therefore be desirable to separate the low molecular weight aluminum alkyls from the high molecular weight aluminum alkyls prior to any recovery of olefins or alcohols. In this way, the low molecular weight aluminum alkyls can be subjected to further growth to obtain the desired high molecular weight olefins or alcohols.

It is therefore an object of this invention to provide a method of separating aluminum alkyls of different molecular weight or separating aluminum alkyls having alkyl substituents of relatively short alkyl chain lengths from those aluminum alkyls having alkyl substituents of relatively long chain length. Other objects and advantages of this invention will be obvious to those skilled in the art from this specification and the claims.

According to this invention, the above objects are accomplished by passing a mixture of aluminum alkyls over an exchange resin. In one specific aspect, the growth product from an aluminum alkyl growth reactor, wherein said aluminum alkyl is reacted with a low molecular weight olefin to yield a mixture of aluminum alkyls with typical Poisson distribution is contacted with an exchange resin having certain functional groups thereon.

It will be obvious that mixtures of such aluminum alkyls from other sources can be separated by the method of this invention.

The alkyl groups of a typical Poisson distribution are as follows.

| Alkyl groups: | Weight percent Based on alkyls |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

In general, the $C_{12}+$ alkyls are those most desired; therefore, this description will be directed to such separation. However, the breaking point can be wherever desired by the proper selection of resin.

The exchange resin is preferably a crosslinked hydrocarbon polymer prepared from vinyl aromatic or aliphatic monomer or a copolymer of the two types. It is necessary that the polymer contain functional groups that will form a strong bond with aluminum alkyl, such as hydroxyl groups as follows:

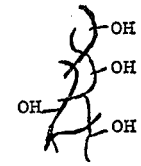

Such resins having a suitable hydrocarbon structure and containing useful functional groups can be made in a number of different ways.

For example, a suitable carbon skeleton can be produced by polymerization of styrene with a chain crosslinking agent such as divinylbenzene, e.g., 0.1 to 15%. Suitable functional groups can be produced on the polymer chain by incorporation of a substituted styrene during polymerization,

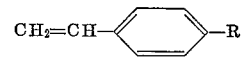

or by chemical alterations of the unsubstituted resin.

Suitable functional groups are any radical which will form a strong bond with the aluminum as previously mentioned. Representative groups are $-NH_2$, $-NHR$, $-C\equiv N$, $-OH$, $-CH_2-OH$, $-C\equiv CH$, $-SH$, $-SR$, etc. wherein R represents a hydrocarbon group. Preferably the functional group will form one only (preferably) or two strong bonds with the alkyl group.

Thus the desired resin can be produced by copolymerizing a mixture of monomers comprising styrene, divinylbenzene and a functionally substituted styrene. The amount of divinylbenzene in the original mixture determines the frequency of crosslinking which in turn determines the average pore size of the resin. The amount of swelling of the resin in a solvent is inversely proportional to the amount of crosslinking. Thus resins with little crosslinking, large pore size, will swell a large amount and those with small pore size will swell very little. A highly swollen resin will give a high exchange rate due to the increased ease of diffusion of molecules into and out of the interior of the resin particles. Pore size is also related to the selectivity of the exchange resin. Molecules larger than the pore size will not be able to diffuse into the resin whereas all smaller molecules will be able to freely enter and leave the resin.

The functional groups introduced by the substituted monomer can be used directly for molecular exchange separation, or the functional group can be chemically modified after formation of the resin. For example, a vinyl resorcinol would provide hydroxyl groups on the polymer directly, whereas a chloromethyl styrene after polymerization could be hydrolyzed to provide hydroxyl groups but of a different type, or the polymer could be reacted with a tertiary amine to give a quaternary amine substituted resin, or with ammonia to give an amine substituted resin. Vinyl pyridine and vinyl quinoline copolymer are readily quaternerized to provide functional groups.

The concentration of functional groups in the resin, or their average spacing along the polymer chains, is determined by the amount of substituted monomer, i.e. chloromethyl styrene, added to the initial mixture of monomers. The concentration of functional groups, exchange sites, will determine the exchange capacity of the resin, in moles per unit weight of resin, i.e., the amount of material separated per cycle of operation per unit weight of resin.

The concentration of exchange sites influences the selectivity of the resin. Large molecules cannot be adsorbed on each of the exchange sites if they are closely spaced, whereas small molecules can be adsorbed without mutual interference. Therefore, the small molecules will be adsorbed in preference to the large ones.

As has been indicated, the crosslinked resin can be prepared free of functional groups and then reacted with reagents capable of introducing functional groups. Sulfonic acid groups may be added to a crosslinked polystyrene resin by reaction with concentrated sulfuric acid at an elevated temperature. Chloromethyl groups can be added by reacting the resin with a mixture of formaldehyde and hydrogen chloride.

Useful exchange resins can be made by copolymerization of many ethylenic monomers with styrene, such as, for example, maleic and fumaric acids, their esters, allyl alcohol etc. as is well known in the art. These monomers will introduce hydroxyl and carboxyl groups in the polymer.

Another suitable polymer consisting of hydrocarbon chains with attached hydroxyl groups can be prepared from ethylene and vinylacetate. These monomers can be copolymerized over a wide range of weight ratios using peroxide polymerization initiators in an emulsion system. After polymerization, the acetate groups are removed via hydrolysis leaving hydroxyl groups on the polymer. The concentration of, or average spacing of, hydroxyl groups is controlled by the initial ratio of the monomers used. This polymer can be crosslinked to render it insoluble by exposure to atomic radiation, or by free radical coupling using dicumaryl peroxide. Heating a polymer containing dicumaryl peroxide decomposes the peroxide groups leaving free radicals which react with the polymer chains to produce crosslinking.

In the same way ethylene can be copolymerized with other unsaturated monomers such as maleic anhydride, maleic and fumaric esters, etc. The last monomer would provide carboxyl and ester functional groups. Ethylenic alcohols and glycols would provide hydroxyl groups.

Highly crosslinked polymers containing a high concentration of "aromatic" hydroxyl groups can be prepared from phenol and formaldehyde.

Urea and melamine can be polymerized with formaldehyde to provide highly crosslinked polymers containing hydroxyl and amine groups.

Polymers having the desired structure and containing suitable functional groups can be made by polymerization of "acrylic" type monomers such as methylacrylate, methylmethacrylate, acrylonitrile, etc. The difunctional monomers can be polymerized to produce crosslinked polymers by addition of monomers having functional groups, use of peroxide initiators, etc.

While the above polymers are illustrative of the wide range of suitable resins, they are not to be considered limiting since any resin of the type described is useful in this invention.

In the following discussion of pore size, reference will be made to the drawings of which:

Figure 1:
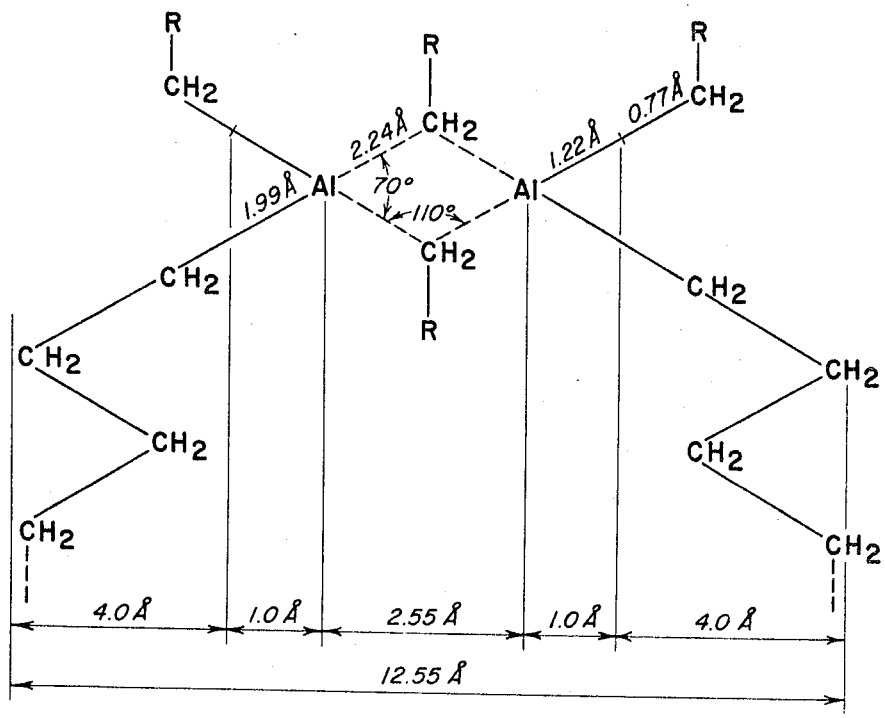
FIGURE 1 is a schematic showing of an alkyl aluminum compound with its long alkyl chains folded parallel.

In determining the desired pore size, it is first necessary to determine the size of the various aluminum alkyl molecules. Aluminum alkyls normally exist as aluminum coupled dimers having the configuration and dimensions as shown in FIGURE 1. Where the alkyl groups are all saturate straight chains, it can be shown that the minimum molecular diameter is about 12.6 A. units.

The alkyl chains are very flexible and may be folded like parallel ropes leading away from the aluminum atoms on each side, see FIGURE 1. The minimum pore size for passing a molecule of this configuration then remains the same whatever the length of the alkyl side chains.

Figure 2:
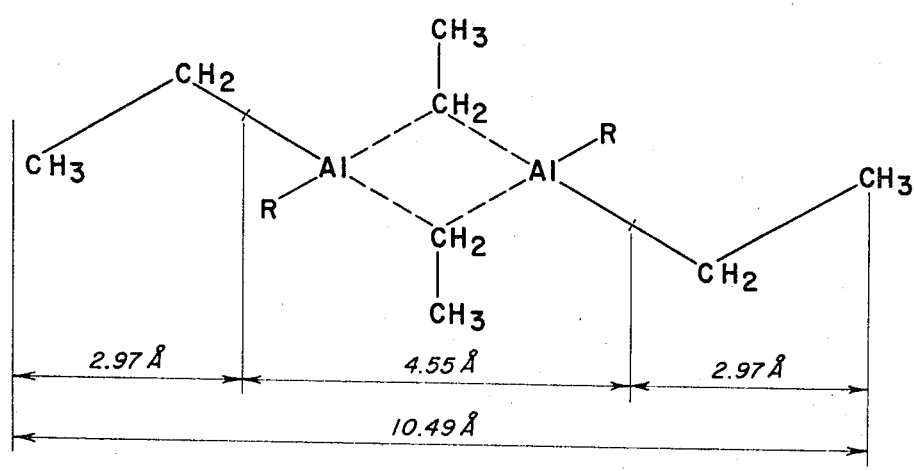
FIGURE 2 is a schematic illustration of triethylaluminum.

On the other hand, triethylaluminum, due to its short side chains is an exception, the diameter being only about 10.5 A. as is shown in FIGURE 2.

Since all trialkylaluminum molecules have the theoretical possibility of passing a 12.6 A. hole, it might at first appear that a resin having this pore size would offer no selectivity. However, the actual configuration of the alkyl chains relative to the aluminum atom is a random distribution of all possible configurations. This distribution obviously results from thermal agitation. The number of molecules having the necessary configuration to pass through a 12.6 A. hole, at any given particular time, will decrease very rapidly as chain length is increased. Thus the smaller molecules will pass through a given pore much faster than larger molecules.

Figure 3:
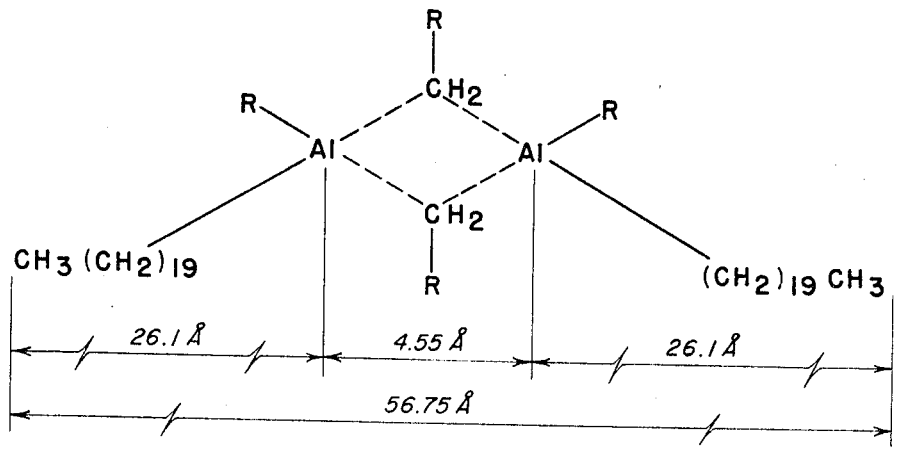
FIGURE 3 is a schematic illustration of trieicosyl aluminum.

The maximum size of the molecule must also be taken into consideration to arrive at the most likely or average size. Maximum size will occur when the alkyl chains are stretched out radially from the aluminum atom like spokes of a wheel. Sizes for this configuration are shown in FIGURES 2 and 3 for triethylaluminum and trieicosylaluminum. Triethylaluminum shows a maximum diameter of about 10.5 A. and treicosylaluminum a diameter of about 56.8 A.

Now it is necessary to know how much to crosslink the polymer to give the desired average pore size.

The carbon chain lengths required to circumscribe a given hole (pore) size is given by the formula:

$$D = \frac{1.25N}{\pi} - 2.42 \text{ A.}$$

or $$N = \frac{D + 2.42 \text{ A.}}{0.597}$$

where D is the hole diameter in A. units and N is the number of carbon atoms in the ring.

Figure 4:
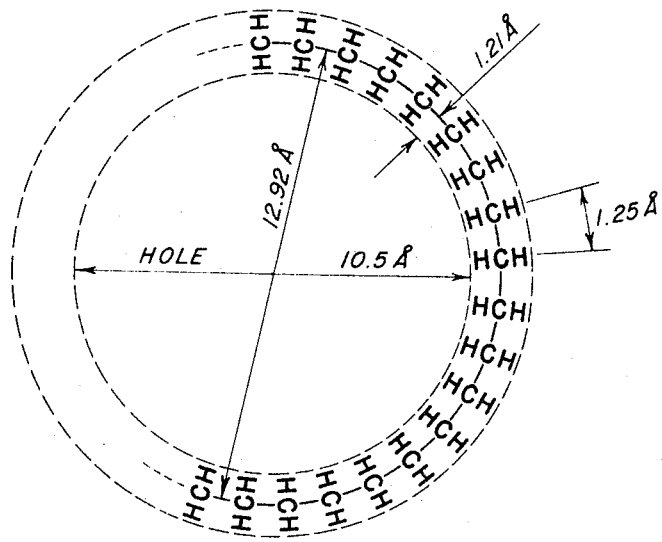
FIGURE 4 is a schematic illustration of a carbon ring system to give a hole of known diameter.

The derivation and application of this equation is apparent from FIGURE 4. Typical results are shown below:

| Hole diameter (A.) | Carbon atoms in ring | Fits maximum diameter of— |
|---|---|---|
| 10.5 | 33 | Triethylaluminum. |
| 36.8 | 99 | Tridodecylaluminum. |
| 56.8 | 149 | Trieicosylaluminum. |

The number of crosslinking molecules needed in the polymer to give the desired average ring size is two per ring. Therefore, for 33 carbon rings, one crosslinking per 16 carbon atoms is needed, or 6.0 mol percent of crosslinking monomer. For the 149 carbon ring, one crosslink per 75 carbons is needed, or 1.34 mol percent crosslinking monomer. For any given average ring size, the amount of crosslinking monomer needed is given by the equation:

$$200/N = \text{mol percent crosslinking monomer}$$

again where N is the number of carbon atoms in the ring.

For detergent production, it is desirable to separate the alkyl aluminum molecules having twelve carbon chain lengths and longer from those having 10 carbon lengths and less. Thus an average pore size is needed which will pass tridodecyl aluminum at its average size.

|  | A. |
|---|---|
| Tridodecylaluminum max. dia. | 36.8 |
| Tridodecylaluminum min. dia. | 12.6 |
| Average dia. | 24.7 |

Therefore, $N=68$ carbons or 2.94 mol percent crosslinking monomer is needed.

Figure 5:
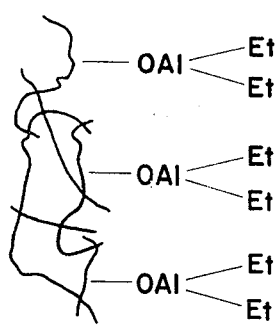
FIGURE 5 is a schematic showing of how triethylaluminum will react with a resin having hydroxyl groups to form alkoxy diethylaluminum groups on the resin.

In operation, a column is filled with the resin of the desired average pore size. The column is then filled with a solvent, preferably the same solvent as used in the growth reactor. Then a solution of triethylaluminum in the same solvent is passed through the column. The triethylaluminum will react with the functional groups, in this case OH as shown above, to form diethylaluminum groups on the resin as is shown in FIGURE 5.

The hydroxy groups are spaced far enough apart (statistically) to prevent the formation of dialkoxy groups on the resin. It is during this exchange process that the separation occurs.

The light alkyl groups will undergo the exchange reaction at a faster rate than will the heavy alkyl groups. Those groups which participate in the exchange reaction will spend a certain percentage of time attached to the immobile resin, and the remaining time in the liquid moving through the column. Those groups undergoing little or no exchange will move through the column with the velocity of the solvent. Those groups undergoing extensive exchange will move through the column at a slower rate since they are attached to the resin part of the time. Thus the aluminum compounds containing the heavier alkyl groups will emerge from the column first, followed progressively by lighter groups. Thus the stream can be diverted into different directions as the entire batch passes through the column thus recovering fractions enriched progressively from heavy aluminum alkyls to the lighter aluminum alkyls. These latter aluminum alkyls can then be returned to the growth reactor for further growth. The higher aluminum alkyls can then be recovered by well known reverse displacement methods as the olefin or can be oxidized and hydrolyzed with $H_2SO_4$ to produce alcohols and alum.

There are several factors involved in the above-described system which will contribute to the separation of aluminum alkyl compounds. The one mentioned above is based on the differential rate of chemical reaction of the different alkyl groups in the exchange resin.

Steric effects will contribute to the separation process. If the functional (OH) groups are spaced (on the average) on the surface of the resin, say, six carbon bond lengths apart, there would be no interference between small groups such as those on triethylaluminum. If heavier molecules such as tridecylaluminum were absorbed on this resin, there would be much crowding and interference between the alkyl groups. Since steric effects would tend to inhibit the adsorption of the heavier molecules, these would contribute to the selectivity of the process. Steric effects would cause the heavier molecules to emerge from the exchange column first, followed progressively by lighter molecules.

Diffusion will contribute to separation in the above described system. The exchange resin beads are porous in respect to the solvent and the aluminum alkyls. The exchange sites are not only on the surface of the resin, but also throughout its internal volume. For reaction to take place, the molecules must diffuse through the solvent liquid and through interstices of the resin.

Since the lighter molecules will diffuse through the solvent faster than the heavy molecules, the lighter molecules will have a greater opportunity to contact the functional groups of the resin. Therefore, these lighter molecules will be detained whereas the heavier molecules will be swept along with the solvent.

Diffusion through the interstices of the resin provides a basis for greater selectivity. By regulating the average pore size in the resin as described, all molecules above a certain size can be excluded from the resin. Since all smaller molecules would diffuse into the stationary resin and spend at least part of the time there, the nonabsorbed, large molecules would be swept out of the column first with the solvent. As has been described, the average size of the pores may be rather well regulated by the amount of crosslinking monomer added before polymerization. In order to open up the pores, it is necessary to use a solvent which would swell the resin. Most of the common solvents are suitable, to name a few: toluene, xylene, kerosenes, etc. readily swell most of the polymers mentioned.

The separation can be carried out at room temperature and atmospheric pressures. The resin has little or no tendency to become inactivated and can be used almost indefinitely. Of course, other temperatures and/or pressures can be used but since they are not needed, no effort need be spent in supplying such.

EXAMPLE

Having defined the invention generally, a specific example is given wherein the effluent from a growth reactor wherein aluminum triethyl is grown with ethylene so as to produce a mixture of aluminum trialkyl having a typical Poisson distribution is separated so as to obtain a fraction of aluminum trialkyls rich in alkyl radicals containing 12 or more carbon atoms and a fraction enriched in trialklaluminum rich in alkyl radicals of 10 and less carbon atoms.

A polymer of resin can be prepared by copolymerizing a monomer recipe as follows:

| Styrene | 74.8 |
|---|---|
| Chloromethylstyrene | 17.0 |
| Divinylbenzene | 8.0 |
| Benzoyl peroxide | 0.2 |

A reactor is used which is preferably glass or glass-lined and is fitted with baffles and stirrers that will produce a high and controllable agitation at all points throughout the reaction mass. A uniform shear rate throughout the reaction mass is desirable to obtain resin in small particles and preferably spherical. An amount of pure water, two to three times the volume of the monomer, is added, together with a small percentage 0.01–1% of a partially hydrolyzed polyvinylacetate resin. This latter resin functions as a suspension agent. Finally, the monomers and peroxide are added and the stirring rate adjusted to disperse the monomer in droplet size. Droplet size is reduced by increased stirring rate and increased concentration of suspending agent. Spheres of from 0.1 mm. to 4 mm. diameter can be easily prepared by this process.

The reaction system is heated to 50 to 100° C. for 6 to 12 hours during which time the droplets will have formed hard spheres of polymer. These spheres can be separated readily from the reaction mixture on a screen or filter and washed free of suspending agent with water. After drying the spheres are hydrolyzed to provide the desired hydroxyl groups.

The spheres are then packed into a separation column and the growth reactor product passed through the column. As has been indicated, the first effluent from the column will be enriched in those aluminum alkyls having large alkyl groups. When the effluent becomes lean in such aluminum alkyl groups, the effluent is diverted and can be returned to the growth reactor for further growth. The initial effluent can then be treated as indicated above to recover either long chain olefins or long chain alcohols.

Although the above discussion of the invention and the drawings has been described in two dimensional terminology, it will be obvious to those skilled in the art that the aluminum alkyl molecules and the resins are in fact three dimensional.

Having thus described the invention, I claim:

1. A method of separating a mixture of aluminum alkyls having alkyl groups of different molecular weight, said method comprising passing said mixture of aluminum alkyls over a porous exchange resin having spaced functional groups substituted thereon which are capable of forming a strong bond with said aluminum alkyls and wherein the pore size of said resin is of a predetermined average size.

2. The method of claim 1 wherein said average pore size is in the range of 10.49 A. to 56.75 A.

3. The method of claim 2 wherein the said pore size is of the average pore size of ½ the maximum dimensions of the largest molecular size to be retained.

4. The method of claim 3 wherein the functional groups are selected from the group consisting of —NH₂, —NHR, —C≡N, —OH, —C≡CH,

—SH, —SR, —SO₂,

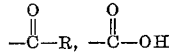

and R₄N⁺, wherein R is a hydrocarbon radical.

5. The method of claim 3 wherein said functional group is —OH.

6. The method of separating a mixture of aluminum alkyls having different molecular weights in the alkyl radicals, which comprises passing said mixture over a cross-linked porous resin having a predetermined average functional group capable of forming a strong bond with said aluminum alkyl groups and having an average pore size large enough to accommodate the largest molecule desired to be retained, recovering a solution enriched in high molecular weight aluminum alkyls until the solution is no longer enriched in such high molecular weight aluminum alkyls, thereafter recovering a solution enriched in low molecular weight aluminum alkyls and passing this latter solution to a growth reactor and growing the low molecular weight alkyls with an olefin to produce additional high molecular weight aluminum alkyls.

7. The method of claim 6 wherein said functional groups are selected from the group consisting of —NH₂, —NHR, —C≡N, —OH, —C≡CH,

—SH, —SR, —SO₂

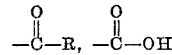

and R₄N⁺, wherein R is a hydrocarbon radical.

8. The method of claim 7 wherein the mixture of alkyl aluminum is the product of a growth reactor having a typical Poisson distribution and the average pore size is 28.4 A.

9. The method of claim 8 wherein the mixture of alkyls is passed over said resin until the recovered aluminum alkyls are no longer enriched in the high molecular weight aluminum alkyls and thereafter passing the recovered aluminum alkyls to a growth reactor wherein the aluminum alkyl of low molecular weight is reacted with additional olefin to produce more high molecular weight material.

10. The method of claim 9 wherein said resin is a co-polystyrene and divinylbenzene and the functional groups are —OH or —CH₂—OH.

References Cited

UNITED STATES PATENTS 3,352,894 11/1967 Crain et al.
3,149,179 9/1964 Bowden.
3,326,953 6/1967 Gautreaux.
3,326,954 6/1967 Gautreaux.

OTHER REFERENCES

Lehmkuhl, Angew. Chem. International Edit. vol. 3, p. 108 (1964) (Corresponding Ziegler Article Ann. Chem. vol. 629, 33–49 (1960)).

Pino et al., Die Makromolekulare Chemie, Bd. 47, pp. 242–246.

TOBIAS E. LEVOW, *Primary Examiner.*

H. M. S. SNEED, *Assistant Examiner.*